United States Patent
Van de Velde et al.

(10) Patent No.: US 12,231,334 B2
(45) Date of Patent: *Feb. 18, 2025

(54) ULTRA RELIABLE SEGMENT ROUTING

(71) Applicant: Nokia Solutions and Networks OY, Espoo (FI)

(72) Inventors: Thierry Van de Velde, Meise (BE); Satish Kanugovi, Bengaluru (IN)

(73) Assignee: Nokia Solutions and Networks Oy, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 18/365,446

(22) Filed: Aug. 4, 2023

(65) Prior Publication Data

US 2023/0379244 A1    Nov. 23, 2023

Related U.S. Application Data

(63) Continuation of application No. 16/867,788, filed on May 6, 2020, now Pat. No. 11,777,846.

(51) Int. Cl.
  *H04L 45/50*    (2022.01)
  *H04L 45/302*   (2022.01)
  (Continued)

(52) U.S. Cl.
  CPC ......... *H04L 45/50* (2013.01); *H04L 45/306* (2013.01); *H04L 45/74* (2013.01); *H04L 67/63* (2022.05); *H04L 69/22* (2013.01)

(58) Field of Classification Search
  CPC ....... H04L 45/50; H04L 67/63; H04L 45/306; H04L 45/74; H04L 69/22
  See application file for complete search history.

(56) References Cited

U.S. PATENT DOCUMENTS 9,497,075 B2   11/2016  DeCusatis et al.
10,063,475 B2   8/2018  Previdi et al.
(Continued)

OTHER PUBLICATIONS

Ford, A. et al. "RFC 6824—TCP Extensions for Multipath Operation with Multiple Addresses", IETF (Jan. 2013): pp. 1-64.
(Continued)

*Primary Examiner* — Glenton B Burgess
*Assistant Examiner* — Jihad K Boustany
(74) *Attorney, Agent, or Firm* — Mendelsohn Dunleavy, P.C.; Steve Mendelsohn

(57) ABSTRACT

SR-enabled network nodes capable of replicating and recombining data packets in a manner that enables reliable, low-latency communications. In an example embodiment, a replicator node transmits to a combinator node multiple copies of a payload over different respective network paths, with the SR headers of the corresponding packets each having a replication segment identifier or a respective SID stack that includes the replication segment identifier. The combinator node delivers/forwards to the corresponding application/destination only the first-to-arrive payload copy and discards any subsequent payload copies based on the replication segment identifier. Some embodiments may beneficially reduce latency and packet loss concurrently and consistently. For example, packet loss may be reduced due to the transmission of multiple copies of the same payload over multiple network paths. Effective latency may be reduced due to the selection of the first-to-arrive payload copy for delivery/forwarding.

18 Claims, 6 Drawing Sheets

(51) Int. Cl.
*H04L 45/74* (2022.01)
*H04L 67/63* (2022.01)
*H04L 69/22* (2022.01)

(56) References Cited

U.S. PATENT DOCUMENTS

| | | | |
|---|---|---|---|
| 10,237,175 | B2 | 3/2019 | Pignataro et al. |
| 10,382,334 | B2 | 8/2019 | Previdi et al. |
| 10,469,370 | B2 | 11/2019 | Filsfils et al. |
| 10,554,537 | B2 | 2/2020 | Ceccarelli et al. |
| 10,601,707 | B2 | 3/2020 | Previdi et al. |
| 2002/0075873 | A1 | 6/2002 | Lindhorst-Ko et al. |
| 2003/0016672 | A1 | 1/2003 | Rosen et al. |
| 2006/0149840 | A1 | 7/2006 | Thompson et al. |
| 2006/0256768 | A1 | 11/2006 | Chan |
| 2011/0096682 | A1 | 4/2011 | Koch et al. |
| 2012/0170585 | A1 | 7/2012 | Mehra et al. |
| 2013/0114606 | A1 | 5/2013 | Schrum, Jr. et al. |
| 2014/0281831 | A1 | 9/2014 | Polehn et al. |
| 2017/0331743 | A1 | 11/2017 | Rimmer et al. |
| 2018/0253234 | A1 | 9/2018 | Fine et al. |
| 2018/0343137 | A1 | 11/2018 | Van de Velde et al. |
| 2019/0104437 | A1 | 4/2019 | Bartfai-Walcott et al. |
| 2019/0273813 | A1 | 9/2019 | Mirsky |
| 2020/0195568 | A1 | 6/2020 | Ali et al. |
| 2020/0228446 | A1* | 7/2020 | Geng ............ H04L 47/34 |
| 2020/0358698 | A1 | 11/2020 | Song et al. |
| 2021/0092052 | A1 | 3/2021 | Tantsura et al. |
| 2021/0136046 | A1 | 5/2021 | Lu et al. |
| 2021/0203603 | A1 | 7/2021 | Fouli et al. |
| 2021/0385169 | A1* | 12/2021 | Urman ............ H04L 1/08 |

OTHER PUBLICATIONS

Filsfils, C. et al. "RFC 8402—Segment Routing Architecture", IETF (Jul. 2018): pp. 1-32.

Filsfils, C. et al. "RFC 8754—IPV6 Segment Routing Header (SRH)", IETF (Mar. 2020): pp. 1-27.

Technical Specification "123 501 V15.2.0 (Jun. 2018)—5G; System Architecture for the 5G System (3GPP TS 23.501 version 15.2.0 Release 15)", ETSI (Jun. 2018): pp. 1-219.

Technical Specification "3GPP TS 23.501 V16.4.0 (Mar. 2020)—3rd Generation Partnership Project; Technical Specification Group Services and System Aspects; System architecture for the 5G System (5GS); Stage 2 (Release 16)", 3GPP (Mar. 2020): pp. 1-430.

Technical Specification "3GPP TS 23.502 V16.4.0 (Mar. 2020)—3rd Generation Partnership Project; Technical Specification Group Services and System Aspects; Procedures for the 5G System (5GS); Stage 2 (Release 16)", 3GPP (Mar. 2020): pp. 1-582.

Filsfils, C. et al. "Internet-Draft: IPv6 Segment Routing Header (SRH)", Document Code: draft-ietf-6man-segment-routing-header-26, IETF (Oct. 2019): pp. 1-32.

Filsfils, C. et al. "Internet-Draft: Network Programming extension: SRv6 uSID instruction", Document Code: draft-filsfils-spring-net-pgm-extension-srv6-usid-04, IETF (Feb. 2020): pp. 1-14.

Filsfils, C. et al. "Internet-Draft: Segment Routing Policy Architecture", Document Code: draft-filsfils-spring-segment-routing-policy-06.txt, IETF (May 2018): pp. 1-34.

Ventre, Pier Luigi, et al. "Segment Routing: A Comprehensive Survey of Research Activities, Standardization Efforts and Implementation Results." arXiv preprint arXiv: 1904.03471 (Jan. 2019): pp. 1-36.

"466 Tbps: The Global Internet Continues to Expand", www.telegeography.com, 2019 [retrieved on Aug. 6, 2020] Retrieved from Internet: <URL: https://blog.telegeography.com/466-tbps-the-global-internet-continues-to-expand> (6 pages).

"Early effects of COVID-19 lockdowns on service provider networks: the networks soldier on!", www.nokia.com, 2020 [retrieved on Aug. 6, 2020] Retrieved from the Internet: <URL: https://www.nokia.com/blog/early-effects-covid-19-lockdowns-service-provider-networks-networks-soldier/> (11 pages).

"YouTube Slashes Video Quality to Save Bandwidth", www.wired.com, 2020 [retrieved on Aug. 6, 2020] Retrieved from the Internet: <URL: https://www.wired.com/story/youtube-slashes-video-quality-save-bandwidth/> (5 pages).

"Impact of Packet Loss, Jitter, and Latency on VoIP", www.netbeez.net, 2016 [retrieved on Aug. 6, 2020] Retrieved from the Internet: <URL: https://netbeez.net/blog/impact-of-packet-loss-jitter-and-latency-on-voip/> (11 pages).

"TCP tuning", www.wikipedia.org, 2020 [retrieved on Aug. 6, 2020] Retrieved from the Internet: <URL: https://en.wikipedia.org/wiki/TCP_tuning> (4 pages).

* cited by examiner

100

400

600

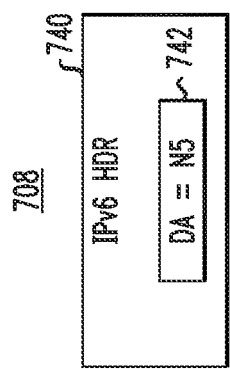 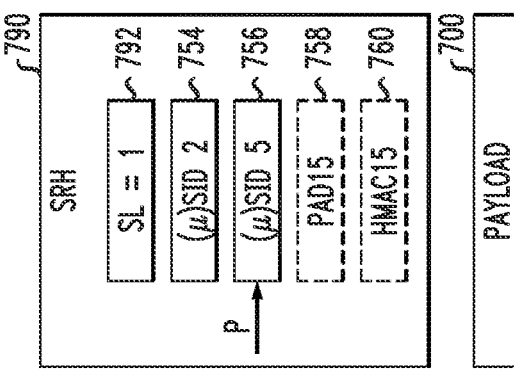 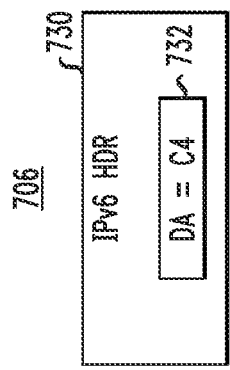 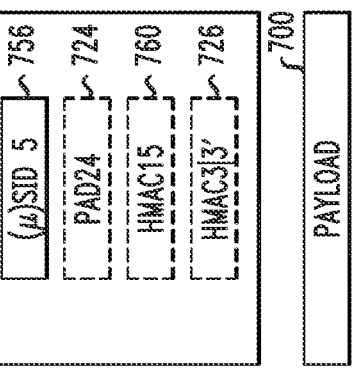 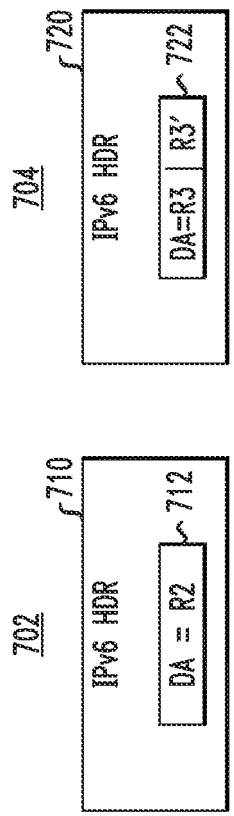 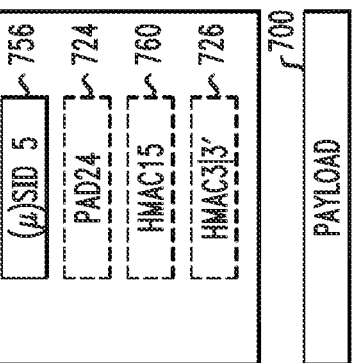 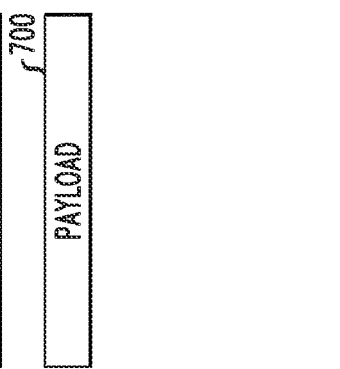

ULTRA RELIABLE SEGMENT ROUTING

CROSS-REFERENCE TO RELATED APPLICATIONS

This is a continuation of co-pending application Ser. No. 16/867,788, filed on May 6, 1920, the teachings of which are incorporated herein by reference in their entirety.

BACKGROUND

Field

Various example embodiments relate to communication equipment and, more specifically but not exclusively, to packet routing.

Description of the Related Art

This section introduces aspects that may help facilitate a better understanding of the disclosure. Accordingly, the statements of this section are to be read in this light and are not to be understood as admissions about what is in the prior art or what is not in the prior art.

Network nodes are typically capable of receiving and routing (e.g., delivering, transmitting, and/or forwarding) data packets. Segment Routing (SR) is an emerging technology that may be used in both Internet Protocol (IP) and Multiprotocol Label Switching (MPLS) packet networks. SR can be implemented in distributed control-plane environments, such as the IP and MPLS control planes, and in centralized control-plane environments, such as those based on Software Defined Networking, SDN. As defined by the Internet Engineering Task Force (IETF), SR can advantageously be used to implement enhanced packet routing, e.g., offering the ability to give certain network-performance guarantees while making more-efficient use of the available network resources and providing greater scalability than some other routing technologies.

SUMMARY OF SOME SPECIFIC EMBODIMENTS

Disclosed herein are various embodiments of SR-enabled network nodes capable of replicating and recombining data packets in a manner that enables reliable, low-latency communications. In an example embodiment, a replicator node transmits to a combinator node multiple copies of a payload over different respective network paths, with the SR headers of the corresponding packets each having a replication segment identifier or a respective segment-identifier stack that includes the replication segment identifier. The combinator node delivers/forwards to the corresponding application/destination only the first-to-arrive payload copy and discards any subsequent payload copies based on the replication segment identifier.

Some embodiments may beneficially reduce latency and packet loss concurrently and consistently. For example, effective packet loss may be reduced due to the transmission of multiple copies of the same payload over multiple network paths. Effective latency may be reduced due to the selection of the first-to-arrive payload copy for delivery/forwarding.

Some embodiments can beneficially be used to provide ultra-reliable, low-latency communication (URLLC) services across independent unmodified IPv6 or MPLS networks.

According to an example embodiment, provided is an apparatus comprising a first node that comprises packet-processing circuitry and a memory, the first node being configured to transmit to a second node a packet set of two or more egress packets in response to an ingress packet, each of the two or more egress packets being temporarily stored in the memory for being transmitted via a different respective network path connecting the first and second nodes; and wherein the packet-processing circuitry is configured to: (i) copy a payload of the ingress packet into each one of the two or more egress packets; and (ii) for each one of the two or more egress packets, generate a respective packet header having a respective segment-identifier (SID) stack, the respective SID stack including at least a first SID and a second SID, the first SID identifying a segment for reaching the second node, the second SID being a replication segment identifier corresponding to the packet set.

According to another example embodiment, provided is an apparatus comprising a first node that comprises packet-processing circuitry and a memory, the first node being configured to receive ingress packets from a second node via a plurality of different network paths, each one of said network paths connecting the first and second nodes; and wherein the packet-processing circuitry comprises a logic circuit configured to determine whether or not to discard a payload of an ingress packet temporarily stored in the memory based on a segment-identifier (SID) stack of a packet header thereof, the SID stack including at least a first SID and a second SID, the first SID identifying a segment used to reach the first node, the second SID being a replication segment identifier corresponding to a packet set of two or more packets, the ingress packet being one of said two or more packets.

According to yet another example embodiment, provided is an apparatus comprising a first node that comprises packet-processing circuitry and a memory, the first node being configured to receive ingress packets from a second node via a plurality of different network paths, each one of said network paths connecting the first and second nodes; and wherein the packet-processing circuitry comprises a logic circuit configured to determine whether or not to discard an ingress packet temporarily stored in the memory based on a replication segment identifier (SID) from a packet header of the ingress packet, the ingress packet being one of two or more packets of a packet set transmitted by the second node, each of the two or more packets including a respective copy of a payload, the replication SID identifying a segment for processing a packet of the packet set at the first node.

In some embodiments of the above apparatus, the packet header of the ingress packet has a single SID, the single SID being the replication SID.

According to yet another example embodiment, provided is an apparatus comprising a first node that comprises packet-processing circuitry and a memory, the first node being configured to transmit to a second node a packet set of two or more egress packets in response to an ingress packet, each of the two or more egress packets being temporarily stored in the memory for being transmitted via a different respective network path connecting the first and second nodes; and wherein the packet-processing circuitry is configured to: (i) copy a payload of the ingress packet into each one of the two or more egress packets; and (ii) for each one of the two or more egress packets, generate a respective packet header having a respective copy of a replication segment identifier (SID), the replication SID identifying a segment for processing a packet of the packet set at the second node.

In some embodiments of the above apparatus, at least one of the respective packet headers has a single SID, the single SID being the replication SID.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 7A-7D show simplified block diagrams of data packets that may be transmitted in the communication system of FIG. 6 according to an embodiment.

DETAILED DESCRIPTION

Figure 1:
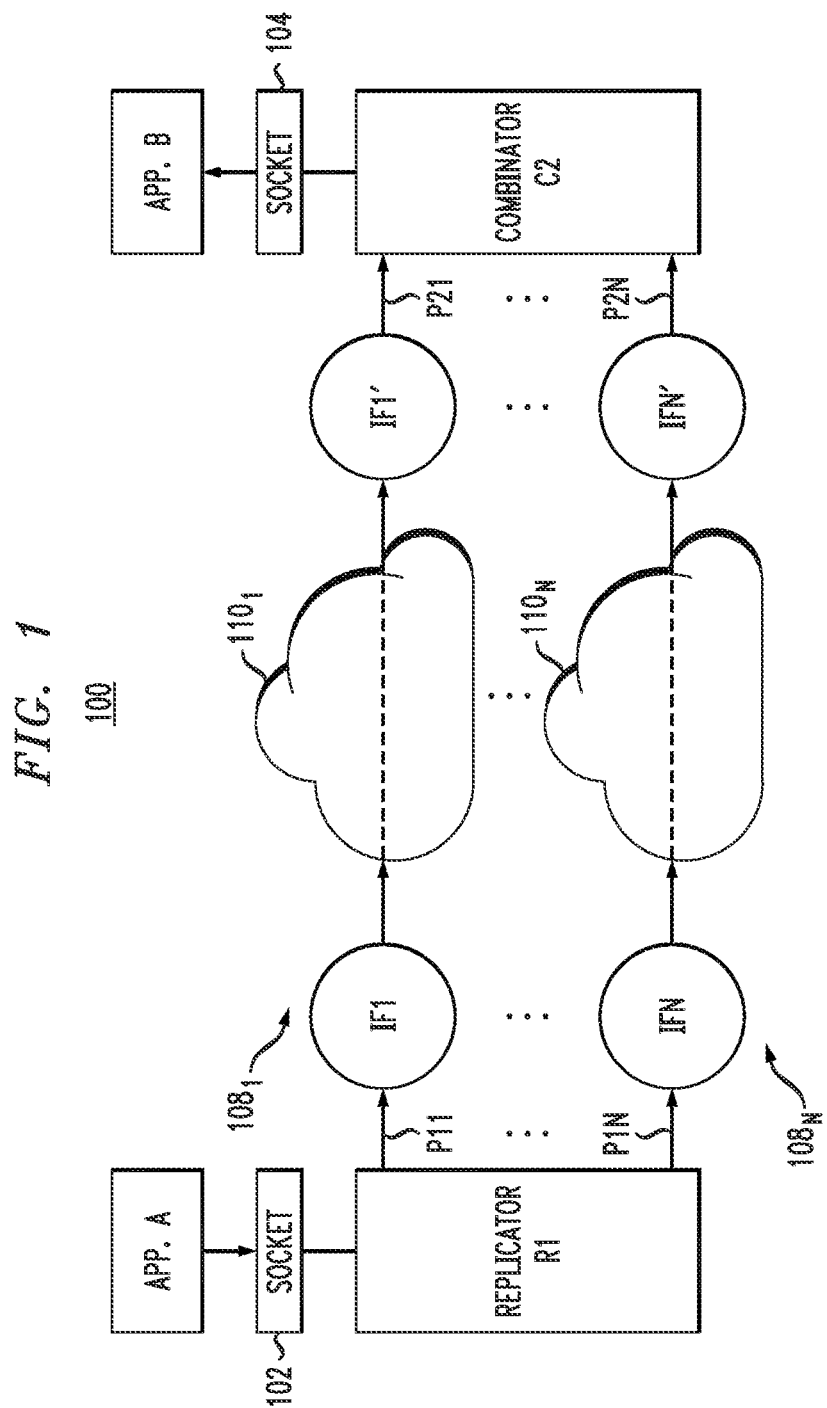
FIG. 1 shows a block diagram of a communication system according to an embodiment.

The following acronyms/abbreviations may be used in the description of various embodiments and/or in the accompanying drawings:

4G/5G Fourth Generation/Fifth Generation;
BGP Border Gateway Protocol;
BSID Binding Segment Identifier;
DA Destination Address;
DMUX Demultiplexer;
DSL Digital Subscriber Line;
DSP Digital Signal Processor;
ESP Encapsulating Security Payload;
FCC Forwarding Control Circuit;
FEC Forwarding Equivalence Class;
FIB Forwarding Information Base;
HDR Header;
HMAC Hash-based Message Authentication Code;
HTTP HyperText Transfer Protocol;
HV Hash Value;
ID Identifier;
IGP Internal Gateway Protocol;
IETF Internet Engineering Task Force;
IP Internet Protocol;
IPsec Internet Protocol Security;
IPv6 Internet Protocol version 6;
L2 Layer 2;
LTE Long-Term Evolution;
MOS Mean Opinion Scor
MPLS Multiprotocol Label Switching;
MP-TCP Multipath Transmission Control Protocol;
MUX Multiplexer;
NR New Radio;
NRT Non Real Time;
NSA Non Stand Alone;
OSI Open Systems Interconnection;
PAD Padding;
QUIC Quick UDP Internet Connections;
RAN Radio Access Network;
RCC Routing Control Circuit;
RFC Request for Comments;
RT Real Time;
RSID Replication Segment Identifier;
R(µ)SID Replication Micro Segment Identifier;
SA Stand Alone;
SDN Software Defined Networking;
SHA Secure Hash Algorithm;
SID Segment Identifier;
SL Segments Left;
SP Segment Path;
SR Segment Routing;
SRH Segment Routing Header;
TCP Transmission Control Protocol;
TLS Transport Layer Security;
TLV Type Length Value;
UDP User Datagram Protocol;
UE User Equipment;
URLLC Ultra Reliable, Low-Latency Communication;
VoIP Voice over IP;
(µ)SID Micro Segment Identifier.

In some text editors not having Greek letters available therein, the acronyms R(µ)SID and (µ)SID may be transcribed as R(u)SID and (u)SID, respectively.

A typical data packet is a formatted unit of data that comprises control information and payload data. The payload data typically form the part of the data packet that is and/or carries the intended message to the corresponding (e.g., remote) data receiver. The control information is sent together with the corresponding payload data to enable proper delivery thereof by the corresponding data-transport system. Control information is typically found in packet headers and trailers, whereas payload data are typically found in the packet portion(s) located between the headers and trailers. In an example implementation, control information may include source and destination IP addresses, error detection codes (such as checksums), sequencing information, etc. Example data packets may be IPv6 packets, MPLS packets, and/or other packets encapsulated in Ethernet frames, Wi-Fi frames, Point-to-Point Protocol frames, Fiber Channel frames, modem frames, etc.

IP routing and MPLS have distinct respective packet-forwarding mechanisms. IP routing relies on IP addresses found in packet headers to make packet-forwarding decisions. In contrast, MPLS makes packet-forwarding decisions based on short path identifiers referred-to as "labels," which are attached to packets. SR is yet another packet-forwarding mechanism. For example, packet-forwarding decisions in SR can be based on instructions (referred-to by segment IDs or SIDs) inserted into packets. As already indicated above, SR can be implemented both over IP routing and over MPLS.

For illustration purposes and without any implied limitations, example embodiments are described herein below primarily in reference to IPv6 routing. From the provided description, a person of ordinary skill in the pertinent art will be able to make and use alternative embodiments, e.g., corresponding to MPLS or other versions of IP routing, without any undue experimentation.

In an example embodiment, IP routing generally relies on IP forwarding tables, which are generated at the respective network nodes using routing information distributed by way of one or more suitable protocols, such as the internal gateway protocol (IGP) and/or the border gateway protocol (BGP). In an example implementation, an IP forwarding table maps destination addresses to the corresponding next hops that packets are expected to take to reach their intended destinations. When a node receives a packet, the node may access the relevant forwarding table using the destination address found in the IPv6 header and then find in the forwarding table a corresponding egress interface for the next hop. The node may then forward the packet through the egress interface. The next node that receives the packet may perform its own forwarding-table lookup using the same destination IP address, and so on.

SR is a routing mechanism in which nodes forward packets using SR forwarding tables and SIDs. Similar to some MPLS labels, SIDs may be relatively short (e.g., compared to the length of an IP address or compared to a forwarding equivalence class, FEC), fixed-length identifiers. Some SIDs may correspond to topological segments of the network or certain services provided by some network nodes. The use of SR may be beneficial, e.g., because the nodes may employ very fast and yet relatively simple SR-enabled forwarding engines. In an example implementation, SR is not dependent on any specific OSI-model data-link-layer (L2) technology.

Some networks may not inherently provide or support the SR functionality. Even in cases where a network does support SR, there might be some portions of the network (e.g., one or more nodes thereof) that do not support SR.

A useful feature provided by IPv6 is the capability to define extension headers. Extension headers are optional headers that may be used to carry additional information in a packet header. Extension headers may be placed in the packet between the fixed IPv6 header and an upper-layer protocol header, e.g., a Transmission Control Protocol (TCP) header. For example, an IPv6 SR header (SRH) can be used to attach a SID stack and cause the packet to be forwarded accordingly by the IPv6 nodes.

Packets can enter an SR-enabled network (e.g., a network of nodes that are SR-enabled) via an ingress edge node, travel hop-by-hop along a segment path (SP) that may include one or more SR-enabled nodes, and then exit via an egress edge node. Topological segments may represent one-hop or multi-hop paths to SR-enabled nodes. Some topological segments may act as sub-paths that can be combined to form an SP. Nodes in SPs make forwarding decisions based on SIDs, as opposed to destination IP addresses of packets. A stack of SIDs can be used to represent a corresponding SP. The packet with the attached SID stack is forwarded along and can traverse the segments of the corresponding SP in the same order as the list order of the SIDs in the SID stack. A forwarding engine operating in the data plane of each SR-enabled node can use the top SID of the SID stack to look up the egress for the next hop. As the packet and the SID stack attached thereto are being forwarded along the SP in a hop-by-hop fashion, SIDs can be sequentially removed from the top of the SID stack. In some embodiments however, the attached SID stack may remain unchanged as the packet is being forwarded along the SP. In such embodiments, a suitable pointer (e.g. the SRv6 "Segments Left" field) or some auxiliary information may be used to identify the active SID in the SID stack. For example, such pointer can be advanced as the packet advances along the SP.

Modern telecommunication services can be categorized into real-time (RT) and non-real-time (NRT) applications. Non-limiting examples of RT applications are video collaborations, live broadcasting, and piloting drones. Non-limiting examples of NRT applications are streaming movies, synchronizing data, and updating software.

Latency and packet loss negatively affect both RT and NRT communications, but with different overall effects. For NRT applications on TCP (or a similar protocol with acknowledgements and retransmissions), the effective throughput (typically quantified as the rate, in Mbps, of successful transfer of information) may be approximately inversely proportional to the product of latency and square root of packet loss. When that effective throughput is low due to latency and packet loss, the end user experience for an NRT application can still be improved, e.g., by switching to the use of a lower-quality codec. However, the use of a different codec may not be able to improve the end-user experience for RT applications, which makes the latter more sensitive to latency and packet loss compared to the end-user experience for NRT applications. For example, for an RT application, such as Voice over IP (VoIP), the Mean Opinion Score (MOS, ranging from 5 or Excellent to 1 or Bad) is typically reduced by one grade for each 100 ms of additional latency. If there is a 10% packet loss however, then any improvements in latency or jitter can disadvantageously be ineffective as the MOS grade will remain below 4 regardless of such improvements.

We have realized that the Internet-user experience can potentially be significantly improved by a capability to reduce latency and packet loss concurrently and consistently, not one at the expense of the other, such as the case may be in legacy SR. On the Internet, the traffic tends to concentrate on the shortest path in an attempt to limit latency, but the congestion (e.g., buffer bloating) on that shortest path disadvantageously increases packet loss. In such cases, legacy SR may be envisaged to redirect loss-sensitive traffic along longer, less-utilized paths, but that would come at the expense of latency. Thus, legacy SR may not always provide an improvement in the end-user experience for RT applications.

Cellular (e.g., 4G or 5G) and wired (e.g., digital subscriber line, DSL) access networks can be combined in various forms of hybrid broadband access. For example, smart phones can be configured to send most traffic over DSL-enabled Wi-Fi, with the 4G/5G mobile broadband being used as a backup when permitted by the user. IETF Request for Comments (RFC) 6824 defines TCP extensions for multipath operation (multipath TCP, MP-TCP) that allow smart-phone manufacturers, application providers, and/or fixed-mobile convergent operators to spread each TCP flow over both of these access technologies. Some mobile network operators have deployed TCP optimizers to preserve bandwidth in the event of packet loss over the air interface. However, these technological developments are not currently being leveraged enough to noticeably benefit RT applications, which are mostly deployed over User Datagram Protocol (UDP) and, as such, may still suffer from excessive access-dependent latency and/or high packet loss. IETF RFC 6824 is incorporated herein by reference in its entirety.

5G New Radio (NR) is being deployed globally to increase spectral efficiency (typically quantified as throughput per one Hz). The 5G NR can be used in at least the following modes: (1) Non-Stand-Alone (5G NSA), in which the radio-access-network (RAN) node splits the Internet bearer across 5G NR and 4G Long-Term Evolution (LTE) access; and (2) Stand-Alone (5G SA), for which the Internet bearer is, at any point in time, either over 5G NR or over 4G LTE. Although 5G SA is more power-efficient for the user equipment (UE), 5G NSA typically provides smoother 4G-5G handovers and an effective bandwidth that is the sum of both bandwidths under dual coverage. Although both NR and LTE may benefit from error correction and retransmissions on the air interface, today's technology does not provide the capability to suitably combine 4G LTE of one operator and 5G SA of another operator for RT applications, e.g., to correspondingly optimize both latency and packet loss.

At least some of the above-indicated problems in the state of the art can advantageously be addressed using at least some embodiments disclosed herein. For example, some embodiments may be used to replicate the traffic from an application over several (e.g., two or more) different access technologies, several different service providers, and/or several different paths through a data network. Some embodiments may beneficially provide one or more of the following capabilities:

(i) automatically achieve a nearly lowest latency and a nearly lowest packet loss achievable with the corresponding individual effectuated access technologies, providers, and/or paths;

(ii) be operable independent of the underlying transport protocol (e.g., TLS/TCP, UDP, IPSec ESP, QUIC, etc.) and/or underlying data plane (e.g., IPv6, MPLS); and (iii) be operable without requiring complex node/network (re)configuration and/or control-plane information to guide the traffic by way of the effectuated access technologies, providers, and/or paths.

Some embodiments may be configured to give priority to RT applications for the use of the above-indicated traffic replication. Some other embodiments may be used to benefit both RT and NRT applications, e.g., when implemented in lesser-loaded networks.

Some embodiments may benefit from the use of at least some features disclosed in IETF RFC 8402, which is incorporated herein by reference in its entirety.

FIG. 1 shows a block diagram of a communication system 100 according to an embodiment. For illustration purposes and without any implied limitations, system 100 is shown in FIG. 1 as being configured to provide data communications between Application A and Application B. Application A is configured to send data to a socket 102 of a replicator node R1 of system 100 using any suitable protocol. Application B is configured to receive data from a socket 104 of a combinator node C2 of system 100 using any suitable protocol. Replicator node R1 is configured to use SR to transmit data packets to combinator node C2 by way of different (e.g., parallel) SPs 1081-108N, where N is an integer greater than one. For illustration purposes and without any implied limitation, each of the SPs 1081-108N is shown in FIG. 1 as being a path through a respective one of networks 1101-110N. The nodes R1 and C2 are connected to the networks 1101-110N such that: (i) an egress port P1n of replicator node R1 is connected to an ingress interface IFn of network 110$n$; and (ii) an ingress port P2n of combinator node C2 is connected to an egress interface IFn' of network 110$n$, where n=1, ..., N.

In response to an ingress packet received from Application A, replicator node R1 operates to generate a corresponding set S of N egress packets to be transmitted over SPs 1081-108N, respectively. Each of the N egress packets of the set S has the same payload as the corresponding ingress packet. If the ingress packet has a Segment Routing Header (SRH), then replicator node R1 modifies said SRH, e.g., as described in more detail below in reference to FIG. 4, and inserts the resulting modified SRH(s) into the egress packets of the set S. If the ingress packet does not have a SRH, then replicator node R1 generates one or more SRHs and inserts the generated SRH(s) into the respective egress packets of the set S. Depending on the specifics of the SPs 1081-108N, the SRHs of different ones of the N egress packets of the set S may be the same or different. Example SRHs that me be inserted by replicator node R1 into egress packets are described below in reference to FIGS. 2 and 4.

SPs 1081-108N operate to carry the sets S of packets transmitted by replicator node R1 toward combinator node C2 based on the routing instructions found in the individual packet headers (e.g., SRHs). The packets of the different sets S typically arrive at combinator node C2 out of sequence and/or interspersed. Some of the packets may be lost in transmission. For each set S, combinator node C2 operates to select only one of the received packets, e.g., as described in more detail below in reference to FIG. 5, and discards the other received packets (if any) of that set S. In an example embodiment, the selected packet may be the first-to-arrive packet of the set S. Combinator node C2 further operates to deliver the selected packet of each set S to Application B.

In some embodiments, replicator node R1 can be implemented using a smart phone, a tablet, a computer, a chip, an operating-system component, a user-space application, a device driver, an IEEE network interface card, a piece of 3GPP User Equipment, a 3GPP Radio Access Network or Core Network function, a modem, a router, a switch, an IEEE Wireless Access Point, a virtualized router or switch, a virtualized network function, a containerized network function, a microservice, an SDN component, an Infrastructure-as-a-Service or Container-as-a-Service platform component. In some embodiments, combinator node C2 can be implemented using a smart phone, a tablet, a computer, a chip, an operating-system component, a user-space application, a device driver, an IEEE network interface card, a piece of 3GPP User Equipment, a 3GPP Radio Access Network or Core Network function, a modem, a router, a switch, an IEEE Wireless Access Point, a virtualized router or switch, a virtualized network function, a containerized network function, a microservice, an SDN component, an Infrastructure-as-a-Service or Container-as-a-Service platform component. In some embodiments, the individual ones of the interfaces IFn and IFn' and the corresponding ports of the nodes R1 and C2 can be implemented based on one or more technologies selected from the following nonexclusive list: (i) Ethernet; (ii) Wi-Fi; (iii) cellular broadband; (iv) satellite radio; (v) Bluetooth; (vi) DSL; (vii) coaxial cable; (viii) fiber-optic; (ix) micro-wave; and (x) in-space communications. Different ones of the interfaces IFn and IFn' may be implemented based on different respective technologies or technology combinations. In some embodiments, some of the networks 1101-110N may be operated by different respective (e.g., independent) operators.

Some embodiments of system 100 may advantageously be able to reduce latency and packet loss concurrently and consistently. For example, effective packet loss can be reduced due to the transmission of multiple copies of the same payload over the corresponding multiple paths. Effective latency can be reduced, e.g., due to the selection for delivery of the first-to-arrive packet of each set S.

Figure 2:
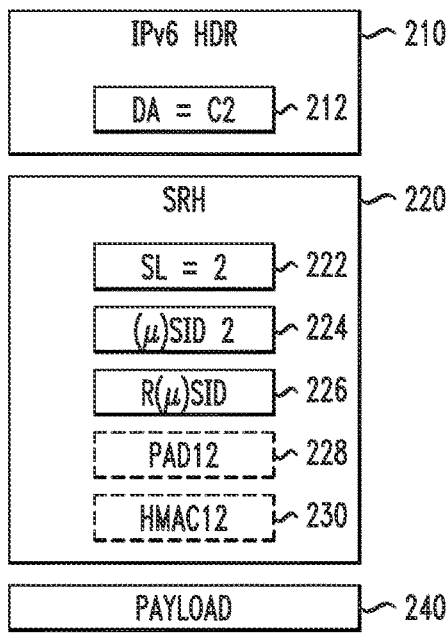
FIG. 2 shows a simplified block diagram of a data packet that may be transmitted in the communication system of FIG. 1 according to an embodiment.

FIG. 2 shows a simplified block diagram of a data packet 200 that may be transmitted on SP 108$n$ by replicator node R1 (FIG. 1) according to an embodiment. For clarity, only some portions of data packet 200 are explicitly shown, and some other portions of data packet 200 are not explicitly shown in FIG. 2 (e.g., see FIG. 4). Data packet 200 comprises an IPv6 header (HDR) 210, an SR header (SRH) 220, and a payload 240.

IPv6 header 210 includes, among other fields, a destination-address (DA) field 212. In IPv6, the destination address identifies the node to which the packet is destined. In this particular example, the destination address of packet 200 is the IP address of combinator node C2, which is indicated in the field 212 of FIG. 2 as DA=C2. The DA length used by IPv6 nodes is 128 bits. In other embodiments, other DA lengths may also be used.

SRH 220 is a Segment Routing Header, which means that the type of IPv6 extension header associated with SRH 220 is "Routing," and the value in the "Routing Type" field of the IPv6 Routing Header is 4. SRH 220 comprises fields 222-230.

Field 222 is a segments-left (SL) field, which provides a count of the segments left in the corresponding SP. In this particular example, SL=2. The corresponding two SIDs are in the fields 224 and 226, respectively. Together, fields 224 and 226 provide an example of the above-mentioned SID stack.

Field 224 has the SID that identifies a segment, the latter being an instruction for reaching combinator node C2, via the corresponding path from replicator node R1, through the corresponding network 110n. For this particular example, the value carried in field 224 is indicated in FIG. 2 as "(μ)SID 2," where μ means micro, and the number 2 stands for the end node of this particular segment, i.e., combinator node C2. Herein, a micro-SID has a length of 16 bits. In other embodiments, other SID lengths may also be used.

In general, field 224 may identify a segment for reaching combinator node C2 or for reaching the combinator application/service instance therein. More specifically, a segment is often referred-to by its segment identifier (SID), which serves as a proxy of the corresponding segment. For example, the above-cited IETF RFC 8402 defines a segment as "an instruction a node executes on the incoming packet (e.g., forward packet according to shortest path to destination, or forward packet through a specific interface, or deliver the packet to a given application/service instance)." In various embodiments, a SID in field 224 may or may not identify an adjacent node. In some embodiments, a SID in field 224 may be a Prefix-SID, which can be used to reach a particular IPv6 subnet. In some embodiments, a SID in field 224 may be an Anycast-SID, which can be used to reach a set of routers. In some embodiments, a SID in field 224 may be a Node-SID, which can be used to identify a single router. In some embodiments, a SID in field 224 may be a Binding-SID (BSID), with the latter being, e.g., in accordance with the Internet Draft by C. Filsfils, et al., entitled "Segment Routing Policy Architecture," having the document identifier "draft-filsfils-spring-segment-routing-policy-06.txt," which Internet Draft is incorporated herein by reference in its entirety.

In some embodiments, field 224 may be absent. In such embodiments, situations in which the replication SID of field 226 is the only SID in the SRH are possible.

Field 226 has the SID that is used in the combination processing performed at combinator node C2 for each set S of N data packets transmitted over SPs 1081-108N by replicator node R1. As such, the combination processing at combinator node C2 is in effect counted as a segment. Each of the N packets of a set S has the same SID value in the respective field 226 of the SRH 220 thereof. For this particular example, the value carried in field 226 is indicated in FIG. 2 as "R(μ)SID," where μ means micro, and the letter R stands for Replication. As already indicated above, a micro-SID has a length of 16 bits or smaller. In other embodiments, other SID lengths may also be used. An example processing method that can be used in replicator node R1 for generating replication SIDs (RSIDs) for different sets S is described in more detail below, e.g., in reference to FIG. 3. Some alternative methods that can be used to generate one or more RSIDs or R(μ)SIDs for a SID stack are described in reference to FIG. 4.

In some embodiments, field 224 may be absent. In such embodiments, situations in which the replication SID of field 226 is the only SID in the SRH of packet 200 are possible.

Fields 228 and 230 have the padding TLV and the HMAC TLV, respectively, corresponding to the SP 108n. These values can be computed in a conventional manner, and the HMAC TLV can then be used to ensure the authenticity and integrity of the SRH 220. For this particular example, the values carried in fields 228 and 230 are indicated in FIG. 2 as "PAD12" and "HMAC12," where the number 12 stands for the start and end nodes of SP 108n, i.e., the nodes R1 and C2.

Payload 240 has a copy of the payload of the corresponding ingress packet in response to which data packet 200 was generated by replicator node R1. As already indicated above, each of the N packets of the corresponding set S has the same payload in the respective packet portion 240.

Figure 3:
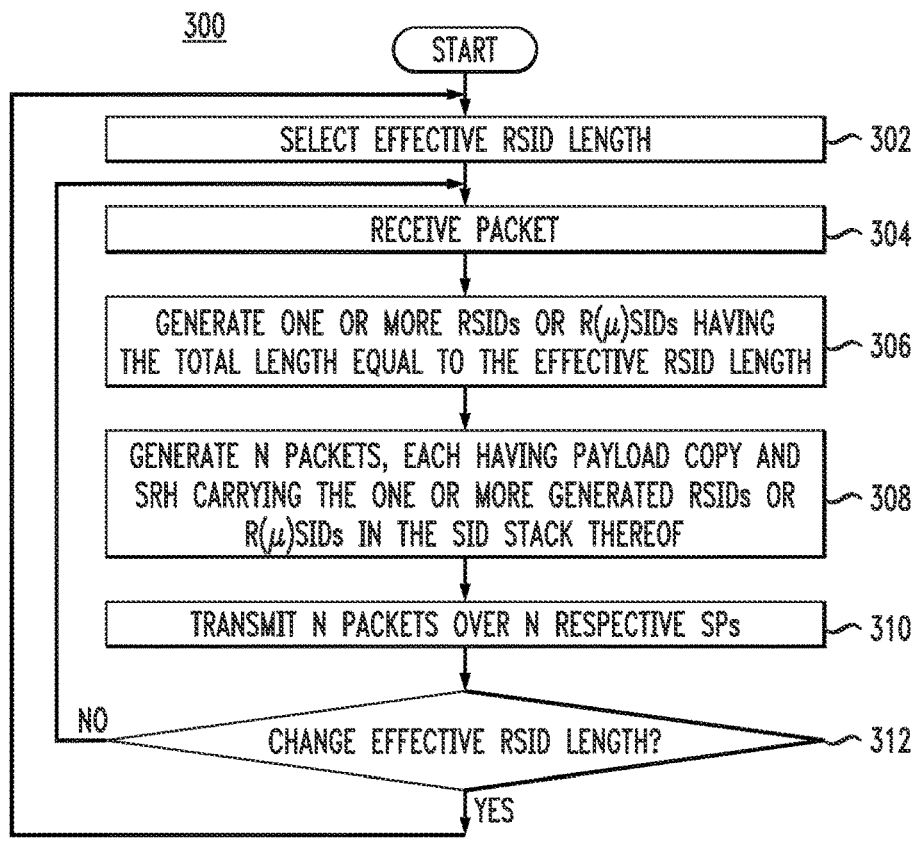
FIG. 3 shows a flowchart of a packet-processing method that can be used in the communication system of FIG. 1 according to an embodiment.

FIG. 3 shows a flowchart of a packet-processing method 300 that can be used in replicator node R1 for generating sets S of packets 200 according to an embodiment.

At step 302 of method 300, a packet processor (e.g., 400, FIG. 4) of replicator node R1 selects an effective length of the RSIDs to be used in the packet SRHs. In an example embodiment, said length may be selected from the interval from 8 bits to 256 bits. In some embodiments, the effective length values available for selection at step 302 may be integer multiples of 16 bits, e.g., 16 bits, 32 bits, 48 bits, and so on.

The initial selection of the effective length (i.e., the selection made at the first instance of step 302) may be made, e.g., using a length estimate generated based on the current traffic conditions in system 100, based on the highest bandwidth-delay product among all paths, or by selecting the shortest (e.g., 16-bit) or longest (e.g., 128-bit) available effective length.

At step 304, replicator node R1 receives a next packet from Application A.

At step 306, the packet processor of replicator node R1 uses a suitable method to generate one or more RSIDs or R(μ)SIDs for a SID stack, said one or more RSIDs or R(μ)SIDs having the total (e.g., combined) length as selected at step 302.

In one example embodiment, step 306 may be implemented using the following example sub-steps: (A) applying a hash function (e.g., SHA-256) to the payload of the packet received at step 304 to generate a corresponding hash value (HV); (B) truncating the generated HV down to the length selected at step 302; and (C) optionally parsing the truncated HV produced at sub-step (B) to generate two or more corresponding R(μ)SIDs for a SID stack.

In another example embodiment, step 306 may be implemented using the following example sub-steps: (i) selecting a hash function from an available preloaded set of hash functions; (ii) applying the hash function selected at sub-step (i) to the payload of the packet received at step 304 to generate a corresponding HV; and (iii) optionally parsing the HV produced at sub-step (ii) to generate two or more corresponding R(μ)SIDs for a SID stack. The different preloaded hash functions may be configured to output hash values of different respective lengths. For example, a first preloaded hash function may be configured to output 16-bit hash values. A second preloaded hash function may be configured to output 32-bit hash values, and so on. The selection made at sub-step (i) is therefore directed at choosing a hash function whose HVs have the length selected at step 302.

In some other embodiments, any suitable combination or derivative of the following binary values may be used as an alternative to payload hashing: (i) a TCP port ID; (ii) a TCP segment number; (iii) the source and/or destination IP address(es); and (iv) selected fields of the IP HDR and/or SRH of a packet received at step 304. In some embodiments, selected control values associated with QUIC, UDP, HTTP, and/or TCP traffic may also be used for some of these purposes.

At step 308, replicator node R1 generates N packets corresponding to the packet received at step 304, thereby generating the corresponding set S of packets. Each packet of said set S has the same payload as the packet received at step 304. In an example embodiment, each packet of said set S also has a respective SRH (e.g., 220, FIG. 2), wherein the SID stack includes the RSID or R(μ)SID (e.g., 226, FIG. 2), or two or more R(μ)SIDs generated at step 306.

At step 310, replicator node R1 transmits the N packets generated at step 308 through ports P11-P1N, respectively.

Step 312 may be based on a feedback information received from combinator node C2, said feedback information being generated based on the results of combination processing thereat of several (e.g., two or more) packet sets S generated and transmitted by replicator node R1 using previous instances of steps 304-310.

For example, combinator node C2 may be configured to monitor collisions between packets of different packet sets S. Herein, a collision is an event in which two packets belonging to two different packet sets S received by combinator node C2 within a relative time interval T0 have identical RSIDs or identical stacks of RSIDs or R(μ)SIDs. In one example embodiment, the time T0 may be the average latency difference between the fastest and slowest of the SPs 1081-108N. In another example embodiment, the time T0 may be the average latency difference between the fastest and second fastest of the SPs 1081-108N.

In an example embodiment, combinator node C2 may be configured to compare the observed rate of collisions with first and second threshold values, the second threshold value being larger than the first threshold value. If the observed rate of collisions is smaller than the first threshold value, then combinator node C2 may send a feedback signal to replicator node R1 requesting a decrease in the effective RSID length. If the observed rate of collisions is larger than the second threshold value, then combinator node C2 may send a feedback signal to replicator node R1 requesting an increase in the effective RSID length. If the observed rate of collisions is between the first and second threshold values, then combinator node C2 may or may not send a feedback signal to replicator node R1 indicating that no change in the effective RSID length is needed.

If there is no feedback or the feedback received at step 312 indicates that no change in the effective RSID length is needed, then the processing of method 300 is directed back to step 304. Otherwise, the processing of method 300 is directed back to step 302, whereat the effective RSID length may be changed according to the feedback. For example, the number of 16-bit R(μ)SIDs for the corresponding SID stack of a packet may be increased or decreased based on the feedback. Said increase/decrease may be implemented, in some embodiments, e.g., by changing the truncated length of the hash values generated using SHA-256 and then parsing the resulting truncated length into the corresponding number of RSIDs or R(μ)SIDs.

Figure 4:
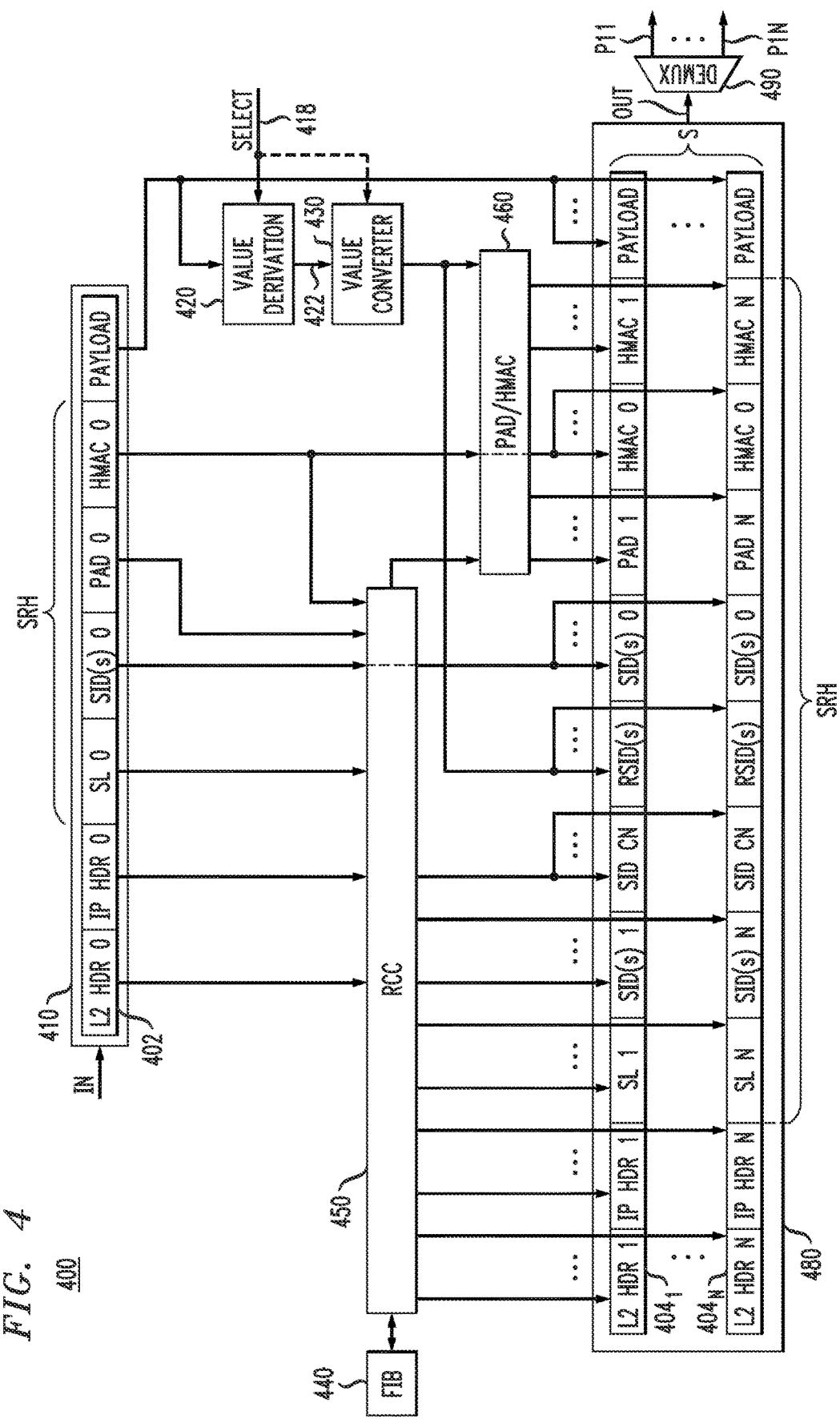
FIG. 4 shows a block diagram of a packet processor that can be used in a replicator node according to an embodiment.
Figure 6:
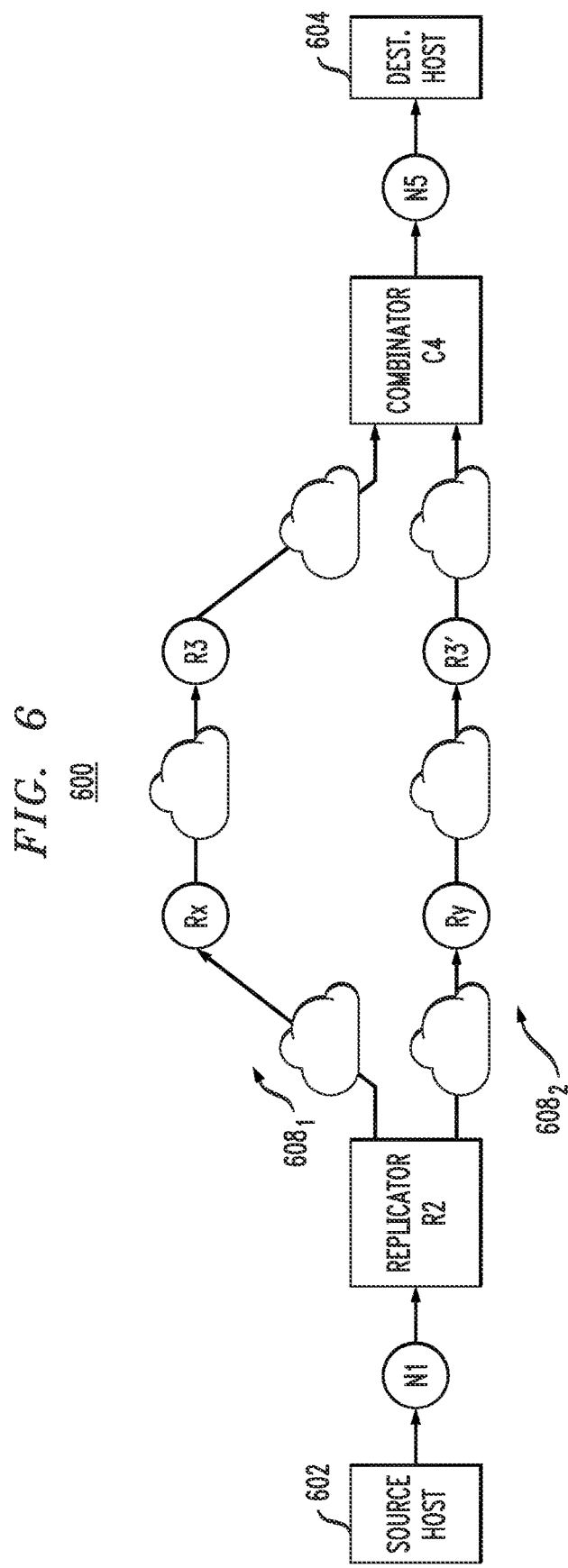
FIG. 6 shows a block diagram of a communication system according to another embodiment.

FIG. 4 shows a block diagram of a packet processor 400 that can be used in a replicator node according to an embodiment. For example, a suitable embodiment of packet processor 400 can be used to implement replicator node R1 of system 100 (FIG. 1). Another suitable embodiment of packet processor 400 can be used to implement a replicator node R2 of system 600 (FIG. 6).

Packet processor 400 comprises packet buffers 410 and 480. Packet buffer 410 is an ingress buffer configured to temporarily store therein ingress packets received, e.g., form Application A (FIG. 1) or node N1 (FIG. 6). Packet buffer 480 is an egress buffer configured to temporarily store therein egress packets, e.g., for being directed to ports P11-P1N (also see FIG. 1). A packet demultiplexer (DMUX) 490 is connected to packet buffer 480 as indicated in FIG. 4 to appropriately distribute the individual packets of each packet set S among ports P11-P1N.

Packet processor 400 further comprises packet-processing circuitry connected between packet buffers 410 and 480 and configured to generate a set S of egress packets 4041-404N in response to an ingress packet 402. In an example embodiment, the packet-processing circuitry comprises a value-derivation module 420, a value converter 430, a forwarding information base (FIB) 440, a routing control circuit (RCC) 450, and a PAD/HMAC computing circuit 460.

For illustration purposes and without any implied limitations, packet 402 is shown in FIG. 4 as comprising a data-link-layer (L2) header, an IPv6 header, a SRH, and a payload. The information carried in the L2 header of packet 402 is denoted as "L2 HDR 0." The information carried in the IPv6 header of packet 402 is denoted as "IP HDR 0." In the shown example, the SRH of packet 402 includes an SL field, one or more SIDs, and padding (PAD) and HMAC TLV fields. The corresponding information stored therein is denoted in FIG. 4 as "SL 0," "SID(s) 0," "PAD 0," and "HMAC 0."

For illustration purposes and without any implied limitations, each packet 404$n$ (where n=1, . . . , N) is shown in FIG. 4 as comprising the following respective portions: an L2 header, an IPv6 header, a SRH, and a payload.

In operation, packet processor 400 writes a respective copy of the payload of packet 402 into each of packets 4041-404N of the corresponding packet set S. Packet processor 400 also operates to copy "HMAC 0" and "SID(s) 0" from the SRH of packet 402 into the corresponding fields of the SRH of each one of packets 4041-404N.

A value-derivation module 420 is illustratively shown as being configured to receive a copy of the payload of packet 402 and derive therefrom a corresponding output value 422. For relatively long output values 422, value converter 430 may optionally truncate and/or parse the output value into two or more R(μ)SIDs. For relatively short output values, value converter 430 may be bypassed, and the whole output value 422 can be used as a single RSID or R(μ)SID. In either case, the resulting one or more RSIDs or R(μ)SIDs are loaded into the corresponding RSID field(s) of the SRH of each one of packets 4041-404N.

In some embodiments, the operation of one of or both circuits 420 and 430 may be controlled by a control signal 418, which can be generated, e.g., in accordance with a suitable embodiment of method 300. This particular feature can be used, e.g., to adaptively change the number of R(μ)SIDs for the corresponding SID stack of a packet.

In some embodiments, circuits 420 and 430 may be replaced by alternative circuits configured to implement alternative methods for generating RSIDs or R(μ)SIDs for different packet sets S. For example, some of such alternative methods are indicated above in the description of step 306 of method 300.

RCC 450 and PAD/HMAC computing circuit 460 operate to perform further packet processing to complete the headers of packets 4041-404N.

For example, RCC 450, in consultation with FIB 440, may first select a suitable combinator node CN for reliably routing therethrough the payload of packet 402. In an example embodiment, FIB 440 may contain pertinent IPv6 forwarding information and/or SR forwarding information. Once the suitable combinator node CN is selected, RCC 450 proceeds to write a corresponding SID (denoted as "SID CN" in FIG. 4) into the corresponding field of the SRH of each one of packets 4041-404N. If the n-th SP to combinator node CN has more than one segment, then RCC 450 proceeds to add the corresponding SID(s) (denoted as "SID(s) n" in FIG. 4) to the SID stack in the SRH of packet 404n, where n=1, . . . , N. Based on the total resulting number of SIDs in the SID stack of packet 404n (denoted as "SL n" in FIG. 4), RCC 450 completes the SL field of the SRH of packet 404n. PAD/HMAC computing circuit 460 then uses the completed fields of the SRH to compute a new padding TLV (denoted as "PAD n" in FIG. 4) and a new HMAC TLV (denoted as "HMAC n" in FIG. 4) to complete the SRH of packet 404n. RCC 450 further operates in a conventional manner to generate the L2 header (denoted as "L2 HDR n" in FIG. 4) and the IPv6 header (denoted as "IP HDR n" in FIG. 4) to complete the header portion of packet 404n. Once the headers of packets 4041-404N are completed, buffer 480 operates to appropriately queue the completed packets at the OUT port thereof for egress through DMUX 490.

As already indicated above, a SID value in the SID CN field of the SRH can be of any suitable type capable of enabling the routing of packet 404n to the combinator node CN. Some nonexclusive type examples are: adjacency SID; Prefix-SID; Anycast-SID; Node-SID; and BSID.

Figure 5:
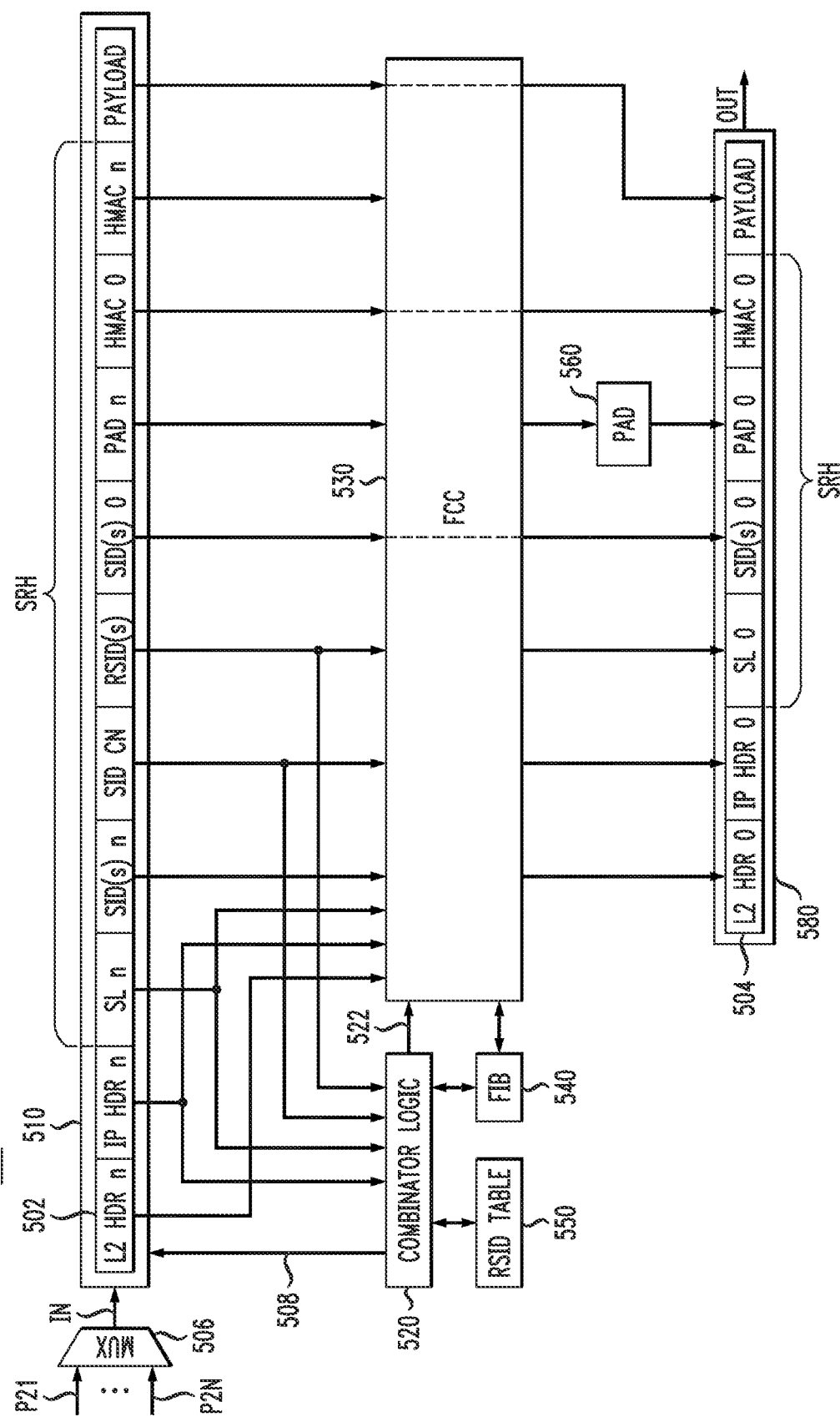
FIG. 5 shows a block diagram of a packet processor that can be used in a combinator node according to an embodiment.

FIG. 5 shows a block diagram of a packet processor 500 that can be used in a combinator node according to an embodiment. For example, a suitable embodiment of packet processor 500 can be used to implement combinator node C2 of system 100 (FIG. 1). Another suitable embodiment of packet processor 500 can be used to implement a combinator node C4 of system 600 (FIG. 6). For illustration purposes and without any implied limitations, functions of packet processor 500 are described below in reference to example operations performed on a data packet 502, which has the same structure as a data packet 404n of FIG. 4, where n=1, . . . , N.

Packet processor 500 comprises packet buffers 510 and 580. Packet buffer 510 is an ingress buffer configured to temporarily store therein ingress packets received, e.g., through ports P21-P2N (also see FIG. 1). A packet multiplexer (MUX) 506 is connected to direct the packets received at any of the ports P21-P2N to the IN port of buffer 510. Packet buffer 580 is an egress buffer configured to temporarily store therein egress packets, e.g., before the egress packets are directed to the OUT port of the egress buffer.

Packet processor 500 further comprises packet-processing circuitry connected between packet buffers 510 and 580. Depending on the packet-processing results, said packet-processing circuitry may cause: (i) packet 502 to be discarded; or (ii) a corresponding packet 504 to be generated and queued in packet buffer 580 for egress through the OUT port thereof. In an example embodiment, the packet-processing circuitry of packet processor 500 comprises a logic circuit 520, a forwarding control circuit (FCC) 530, a forwarding information base (FIB) 540, an RSID table 550, and a PAD-computing circuit 560. In an example embodiment, FIB 540 may be analogous to FIB 440 (FIG. 4).

In operation, logic circuit 520 interacts with FIB 540 and RSID table 550 to determine whether packet 502 is to be discarded or converted into packet 504. The following description provides a non-exclusive example of certain relevant processing steps that logic circuit 520 may execute in response to packet 502. A person of ordinary skill in the art will understand that logic circuit 520 may also be configured to perform additional processing steps and/or logic operations to make other/additional decisions regarding some packets temporarily stored in buffer 510.

First, logic circuit 520 may operate to confirm that packet 502 is intended for combination processing in packet processor 500. This objective can be achieved, e.g., by: (i) confirming that the IPv6 header "IP HDR n" of packet 502 has a proper local DA; (ii) checking the "SL n" and "SID CN" fields of the SRH of packet 502 to confirm that the host combinator node is the intended combinator node; and (iii) optionally consulting with FIB 540 to obtain reference information as may be needed.

After it is confirmed that packet 502 is intended for combinator processing in the host node, logic circuit 520 may proceed to read the "RSID(s)" field(s) of the SRH of packet 502. If more than one field was used at the source replicator node to write the corresponding RSID value into the SRH, then logic circuit 520 may reconstruct said RSID value by properly concatenating the corresponding two or more R(μ)SIDs of the SRH of packet 502. In either case, logic circuit 520 obtains the full RSID value used to identify the corresponding packet set S (also see FIG. 4).

Next, logic circuit 520 operates to look up the obtained RSID in RSID table 550.

If the RSID corresponding to packet 502 is not found in RSID table 550, then logic circuit 520 concludes that packet 502 is the first-to-arrive packet of the corresponding set S (also see FIG. 4) and proceeds to generate an appropriate control signal 522 that configures FCC 530 to generate the egress packet 504 corresponding to this packet 502, e.g., as further described below. Logic circuit 520 also operates to: (i) save the RSID corresponding to this packet 502, with the corresponding time stamp, in RSID table 550; (ii) start an expiration timer associated with the saved RSID; and (iii) start a packet counter configured to count the number of received packets from the corresponding packet set S, i.e., the packets associated with the same RSID. The expiration timer is configured to run from a fixed selected value down to zero, at which point the saved RSID is deleted from RSID table 550. The packet counter is configured to count the number of received packets from the corresponding packet set S by incrementing the count value by one each time a new packet with the same RSID is detected by logic circuit 520 in buffer 510. When the count value reaches N, the saved RSID is deleted from RSID table 550. The RSID deletion from RSID table 550, through either mechanism (i.e., based on the expiration timer or packet counter), helps to minimize or avoid possible RSID collisions in RSID table 550 for different packet sets S. The latter may help to keep the effective full RSID values relatively short and the corresponding replication/combination overhead as small as practically possible (also see the description of method 300, FIG. 3, for embodiments directed at adaptively changing the length of the RSID value).

If the RSID corresponding to packet 502 is found in RSID table 550, then logic circuit 520 concludes that packet 502 is not the first-to-arrive packet of the corresponding set S (also see FIG. 4) and proceeds to generate an appropriate control signal 508 that causes ingress buffer 510 to delete (flush) this packet 502. Logic circuit 520 also operates to: (i) increment by one the packet-count value in the corresponding packet counter; and (ii) generate an appropriate control signal 522 that configures FCC 530 to ignore this packet 502, i.e., not to generate a corresponding egress packet 504.

For the first-to-arrive packet 502 of the corresponding packet set S, control signal 522 generated by logic circuit 520 configures FCC 530 to generate the corresponding packet 504 in egress buffer 580. In an example embodiment, FCC 530 may generate packet 504 by performing at least the following operations: (i) copying the payload of packet 502 into the payload portion of packet 504; (ii) generating a new L2 header (denoted as "L2 HDR 0" in FIG. 5) in a conventional manner; (iii) generating a new IPv6 header (denoted as "IP HDR 0" in FIG. 5) based on the IPv6 header and SRH of packet 502; (iv) copying the "HMAC 0" and "SID(s) 0" values from the SRH of packet 502 into the corresponding fields of the SRH of packet 504; (v) calculating the new SL value (denoted as "SL 0" in FIG. 5) based on the "SL n" value and pertinent SRH fields of packet 502; and (vi) providing necessary information to PAD-computing circuit 560 for calculating the new padding TLV (denoted as "PAD 0" in FIG. 5).

In the shown example embodiment, the SRH of packet 504 has fewer fields than the SRH of packet 502. More specifically, the following fields of the SRH of packet 502 are not present (e.g., effectively deleted) in the SRH of packet 504: "SID(s) n," "SID CN," "RSID(s)," "PAD n," and "HMAC n." In an alternative embodiment, some of these SRH fields may still be present in packet 504, but with the field SL 0 having an inferior value compared to the field SL n of packet 502. In some embodiments, the entire SRH may be removed. In some embodiments, a new header, e.g., from another protocol, may be inserted into packet 504.

Once packet 504 is completed, buffer 580 operates to appropriately queue this packet at the OUT port thereof for egress therefrom.

FIG. 6 shows a block diagram of a communication system 600 according to another embodiment. For illustration purposes and without any implied limitations, system 600 is shown in FIG. 6 as being configured to provide data communications between a source host device 602 and a destination host device 604. Device 602 is configured to send data packets to a replicator node R2 by way of a node N1. Device 604 is configured to receive data packets from a combinator node C4 by way of a node N5. Replicator node R2 is configured to use SR to transmit data packets to combinator node C4 by way of SPs 6081 and 6082. For illustration purposes and without any implied limitation, SP 6081 is shown in FIG. 6 as being through nodes Rx and R3; and SP 6082 is shown in FIG. 6 as being through nodes Ry and R3'. The nodes N1 and N5 are SR-capable endpoint nodes in a generic SR deployment. The nodes Rx and Ry are IPv6 routers transparent to SR. The nodes R3 and R3' are SR-capable IPv6 routers.

In an example embodiment, replicator node R2 may be implemented using an embodiment of packet processor 400 (FIG. 4) corresponding to N=2. Combinator node C4 may be implemented using an embodiment of packet processor 500 (FIG. 5) corresponding to N=2.

FIGS. 7A-7D show simplified block diagrams of data packets that may be transmitted in system 600 (FIG. 6) according to an embodiment. All of the shown packets have the same payload 700. In each of FIGS. 7A-7D, a respective pointer P points at the active segment in the SID stack of the corresponding SRH. The vertical dividers used in the header fields 722, 726, and 774 are used to separate the respective values corresponding to SPs 6081 and 6082. More specifically, the value shown to the left of the vertical divider is used in the packet propagating through SP 6081, whereas the value shown to the right of the vertical divider is used in the packet propagating through SP 6082.

FIG. 7A illustrates an example structure of a packet 702 transmitted through the segment N1-R2. The field 712 of an IPv6 header 710 has the IP address of replicator node R2 as the DA, which is indicated in FIG. 7A as "DA=R2." The SL field 752 of a SRH 750 indicates SL=2, meaning that there are two segments in the corresponding SP. The first of the two segments is the segment N1-R2. The corresponding SID (indicated as "(μ)SID 2") is in the field 754 of SRH 750. The second of the two segments is the segment R2-N5. The corresponding SID (indicated as "(μ)SID 5") is in the field 756 of SRH 750. The fields 758 and 760 of SRH 750 have the padding TLV (indicated as "PAD 15") and HMAC TLV (indicated as "HMAC 15"), respectively, corresponding to the path between the nodes N1 and N5.

FIG. 7B illustrates an example structure of a packet 704 transmitted through the segment R2-R3 (or R2-R3'). Replicator node R2 can convert packet 702 into packet 704, e.g., as described in reference to FIG. 4. In particular, the field 722 in an IPv6 header 720 of packet 704 has the IP address of node R3 (or R3') as the DA, which is indicated in FIG. 7B as "DA=R3|3'." The SL field 772 of a SRH 770 indicates SL=4 because three additional segments have been added by replicator node R2 in the SID stack of SRH 770 compared to that of SRH 750. The first of the three additional segments corresponds to the topological segment R2-R3 (or R2-R3'). The corresponding SID (indicated as "(μ)SID 3|3'") is in the field 774 of SRH 770. The second of the three additional segments corresponds to the topological segment R3-C4 (or R3'-C4). The corresponding SID (indicated as "(μ)SID 4") is in the field 776 of SRH 770. The third of the three additional segments represents the combinator processing in the packet processor (e.g., 500, FIG. 5) of combinator node C4. The corresponding SID (indicated as "R(μ)SID(s)") is in the field 778 of SRH 770. The fields 724 and 726 of SRH 750 have the padding TLV (indicated as "PAD 24") and HMAC TLV (indicated as "HMAC 3|3'"), respectively, which are valid only for the respective path(s) between the nodes R2 and C4. The field 758 has been deleted.

Note that, in some embodiments, the "HMAC 15" field 760 may be transported over the paths R2-R3-C4 and R2-R3'-C4 (as indicated in FIG. 7B) but is only verified at the node N5. The nodes R3 and C4 only verify the validity of the "HMAC 3" inserted into the corresponding field 726 by replicator node R2. The nodes R3' and C4 similarly verify the validity of the "HMAC 3'" inserted into the corresponding field 726 by replicator node R2.

FIG. 7C illustrates an example structure of a packet 706 transmitted through the topological segment R3-C4 (or R3'-C4). Packet 706 differs from packet 704 (FIG. 7B) in several fields. For example, the field 732 in an IPv6 header 730 of packet 706 has the IP address of node C4 as the DA, which is indicated in FIG. 7C as "DA=C4." The pointer P has advanced forward and is now pointing at the field 776 instead of the field 774 (also see FIG. 7B). Accordingly, the SL field 782 of a SRH 780 indicates SL=3.

FIG. 7D illustrates an example structure of a packet 708 transmitted through the topological segment C4-N5. Combinator node C4 can convert packet 706 into packet 708, e.g., as described in reference to FIG. 5. In particular, the field 742 in an IPv6 header 740 of packet 708 has the IP address of node N5 as the DA, which is indicated in FIG. 7D as "DA=N5." The SID fields 774, 776, and 778 have been removed from the SID stack. The pointer P has advanced forward and is now pointing at the field 756. Accordingly, the SL field 792 of a SRH 790 indicates SL=1. The "PAD 24" field 724 and "HMAC 3|3'" field 726 have been deleted. The "PAD 15" field 758 has been recomputed and reinstated.

Although some example embodiments are described above in reference to the use of hash functions for generating RSID's or R(µ)SID's for the SRHs corresponding to replicated payloads, alternative embodiments are not so limited. In general, any set of binary values suitably mapped on the payloads can be used for this purpose as long as said set of binary values is capable of providing sufficient entropy to distinguish different payloads within the average latency difference between the fastest and slowest SPs.

According to an example embodiment disclosed above, e.g., in the summary section and/or in reference to any one or any combination of some or all of FIGS. 1-7, provided is an apparatus comprising: a first node (e.g., R1, FIG. 1) that comprises packet-processing circuitry (e.g., 420-460, FIG. 4) and a memory (e.g., 410, 480, FIG. 4), the first node being configured to transmit to a second node (e.g., C2, FIG. 1) a packet set (e.g., S, FIG. 4) of two or more egress packets (e.g., 4041-404N, FIG. 4) in response to an ingress packet (e.g., 402, FIG. 4), each of the two or more egress packets being temporarily stored in the memory for being transmitted via a different respective network path (e.g., 1081-108N, FIG. 1) connecting the first and second nodes; and wherein the packet-processing circuitry is configured to: copy a payload (e.g., "Payload," FIG. 4) of the ingress packet into each one of the two or more egress packets; and for each one of the two or more egress packets, generate a respective packet header (e.g., SRH's of 4041-404N, FIG. 4) having a respective segment-identifier (SID) stack, the respective SID stack including at least a first SID and a second SID, the first SID (e.g., "SID CN," FIG. 4) identifying a segment for reaching the second node, the second SID (e.g., "RSID," FIG. 4) being a replication segment identifier corresponding to the packet set.

Herein, the term "segment" refers to an instruction a node executes on a packet, e.g., an instruction to forward the packet according to the shortest path to the destination, an instruction to forward the packet through a specific interface, or an instruction to deliver the packet to a given application/service instance. The term "segment identifier" or "SID" refers to a binary value associated with the segment, which, when pointed to at the corresponding router, causes the router to invoke the corresponding segment for execution. Different types of segments can be represented by different types of SIDs. Some nonexclusive SID-type examples are: (i) adjacency SID; (ii) Prefix-SID; (iii) Anycast-SID; (iv) Node-SID; and (v) BSID. Herein, the term "segment identifier" or "SID" should be construed to also cover a "replication segment identifier," abbreviated as RSID or R(µ)SID and used in a SID stack, e.g., as described in this specification. The term "segment identifier" or "SID" should further be construed to cover segment identifiers of different lengths. For example, in some embodiments, a SID may have any length in the interval from 8 to 256 bits. In some embodiments, a (µ)SID can be 16-bit long. Description of other examples of SIDs and (µ)SIDs, including RSIDs and R(µ)SIDs, can be found in this specification.

Herein, a "network path" is not limited to a path through a single network. For example, in some embodiments, a network path may be a path through two or more different networks.

Herein, "a segment for reaching the second node" should be construed to also encompass a segment for reaching an application/service instance in or at the second node.

In some embodiments of the above apparatus, the packet-processing circuitry is configured to cause at least one of the respective SID stacks to include a respective third SID (e.g., "SID(s) n," where n=1, . . . , N, FIG. 4), the respective third SID being an identifier of a segment (e.g., Node-SID of R3, FIG. 6) in the respective network path.

In some embodiments of any of the above apparatus, the first node is configured to receive the ingress packet from a third node (e.g., N1, FIG. 6) or from an application (e.g., Application A, FIG. 1).

In some embodiments of any of the above apparatus, the apparatus further comprises user equipment (e.g., a cell phone) configured to implement the first node.

In some embodiments of any of the above apparatus, the packet-processing circuitry is configured to generate the second SID based on the ingress packet.

In some embodiments of any of the above apparatus, the packet-processing circuitry is configured to derive the second SID from the payload.

In some embodiments of any of the above apparatus, the packet-processing circuitry is configured to apply a hash function to the payload to generate the second SID.

In some embodiments of any of the above apparatus, the second SID is one of two or more second SIDs (e.g., "RSID(s)," FIG. 4) generated by the packet-processing circuitry for the respective SID stack.

In some embodiments of any of the above apparatus, the packet-processing circuitry is configurable (e.g., using 418, FIG. 4) to adaptively change a number of said second SIDs.

In some embodiments of any of the above apparatus, the packet-processing circuitry is configured to adaptively change the number of said second SIDs based on a feedback from the second node.

In some embodiments of any of the above apparatus, the packet-processing circuitry comprises a value-derivation module (e.g., 420, FIG. 4) and a value converter (e.g., 430, FIG. 4), the value derivation-module being configured to derive an output value (e.g., 422, FIG. 4) from the payload, the value converter being configured to generate the second SID by applying to the output value at least one of a truncation operation and a parsing operation.

In some embodiments of any of the above apparatus, the packet-processing circuitry is configured to copy a first authentication-code value from the ingress packet into each one of the respective headers of the two or more egress packets (e.g., "HMAC 0," FIG. 4); and wherein the packet-processing circuitry comprises an authentication code computing circuit (e.g., 460, FIG. 4) configured to compute respective second authentication-code values (e.g., "HMAC n," where n=1, . . . , N, FIG. 4) for the respective packet headers of the two or more egress packets.

In some embodiments of any of the above apparatus, the packet-processing circuitry comprises a padding computing circuit (e.g., 460, FIG. 4) configured to compute respective padding values (e.g., "PAD n," where n=1, . . . , N, FIG. 4) for the respective packet headers of the two or more egress packets.

In some embodiments of any of the above apparatus, the first node further comprises a packet demultiplexer (e.g., 490, FIG. 4) to connect the memory to the different respective network paths.

According to another example embodiment disclosed above, e.g., in the summary section and/or in reference to any one or any combination of some or all of FIGS. 1-7, provided is an apparatus comprising a first node (e.g., C2, FIG. 1; C4, FIG. 6) that comprises packet-processing circuitry (e.g., 520-560, FIG. 5) and a memory (e.g., 510, 550, 580, FIG. 5), the first node being configured to receive ingress packets from a second node (e.g., R1, FIG. 1; R2, FIG. 6) via a plurality of different network paths (e.g., 1081-108N, FIG. 1; 6081-6082, FIG. 6), each one of said network paths connecting the first and second nodes; and wherein the packet-processing circuitry comprises a logic circuit (e.g., 520, FIG. 5) configured to determine whether or not to discard a payload of an ingress packet (e.g., 502, FIG. 5) temporarily stored in the memory based on a segment-identifier (SID) stack of a packet header thereof (e.g., SRH of 502, FIG. 5), the SID stack including at least a first SID and a second SID, the first SID (e.g., "SID CN," FIG. 5) identifying a segment used to reach the first node, the second SID (e.g., "RSID," FIG. 5) being a replication segment identifier corresponding to a packet set (e.g., S, FIG. 4) of two or more packets, the ingress packet being one of said two or more packets.

In some embodiments of the above apparatus, the packet-processing circuitry is configured to: copy the payload (e.g., "Payload," FIG. 5) of the ingress packet (e.g., using 522, 530, FIG. 5) into a corresponding egress packet (e.g., 504, FIG. 5) if the logic circuit determines that the ingress packet is a first-to-arrive packet of the packet set; and discard the ingress packet (e.g., using 508, FIG. 5) if the logic circuit determines that the ingress packet is a subsequent (e.g., second-to-arrive or later) packet of the packet set.

In some embodiments of any of the above apparatus, the first node is configured to transmit the egress packet to a third node (e.g., N5, FIG. 6) or deliver the egress packet to an application (e.g., Application B, FIG. 1).

In some embodiments of any of the above apparatus, the packet-processing circuitry further comprises a padding computing circuit (e.g., 560, FIG. 5) configured to compute a padding value (e.g., "PAD 0," FIG. 5) for a packet header of the egress packet.

In some embodiments of any of the above apparatus, the apparatus further comprises user equipment (e.g., a cell phone) configured to implement the first node.

In some embodiments of any of the above apparatus, the packet-processing circuitry is configured to save in a lookup table (e.g., 550, FIG. 5) the second SID of the ingress packet if the logic circuit determines that the ingress packet is a first-to-arrive packet of the corresponding packet set.

In some embodiments of any of the above apparatus, the packet-processing circuitry is configured to delete the saved second SID from the lookup table in response to an earlier of (i) a run-out of an expiration timer associated with the saved second SID and (ii) receipt of all of the two or more packets of the packet set.

In some embodiments of any of the above apparatus, the first node further comprises a packet multiplexer (e.g., 506, FIG. 5) to connect the memory to the different network paths.

According to yet another example embodiment disclosed above, e.g., in the summary section and/or in reference to any one or any combination of some or all of FIGS. 1-7, provided is an apparatus comprising a first node (e.g., C2, FIG. 1; C4, FIG. 6) that comprises packet-processing circuitry (e.g., 520-560, FIG. 5) and a memory (e.g., 510, 550, 580, FIG. 5), the first node being configured to receive ingress packets from a second node (e.g., R1, FIG. 1; R2, FIG. 6) via a plurality of different network paths (e.g., 1081-108N, FIG. 1; 6081-6082, FIG. 6), each one of said network paths connecting the first and second nodes; and wherein the packet-processing circuitry comprises a logic circuit (e.g., 520, FIG. 5) configured to determine whether or not to discard an ingress packet (e.g., 502, FIG. 5) temporarily stored in the memory based on a replication segment identifier (SID) (e.g., "RSID," FIG. 5) from a packet header (e.g., SRH of 502, FIG. 5) of the ingress packet, the ingress packet being one of two or more packets of a packet set (e.g., S, FIG. 4) transmitted by the second node, each of the two or more packets including a respective copy of a payload (e.g., "Payload," FIG. 5), the replication SID identifying a segment for processing a packet of the packet set at the first node.

In some embodiments of the above apparatus, the packet header of the ingress packet comprises a SID stack that includes at least a first SID (e.g., "SID CN," FIG. 5) and the replication SID, the first SID identifying a segment used to reach the first node.

In some embodiments of any of the above apparatus, the packet-processing circuitry is configured to: copy the payload of the ingress packet into a corresponding egress packet (e.g., 504, FIG. 5) if the logic circuit determines that the ingress packet is a first-to-arrive packet of the packet set; and discard the ingress packet (e.g., using 508, FIG. 5) if the logic circuit determines that the ingress packet is a subsequent packet of the packet set.

In some embodiments of any of the above apparatus, the packet-processing circuitry is configured to save in a lookup table (e.g., 550, FIG. 5) the replication SID of the ingress packet if the logic circuit determines that the ingress packet is a first-to-arrive packet of the corresponding packet set.

In some embodiments of any of the above apparatus, the packet-processing circuitry is configured to delete the saved replication SID from the lookup table in response to an earlier of (i) a run-out of an expiration timer associated with the saved replication SID and (ii) receipt of all of the two or more packets of the packet set.

In some embodiments of any of the above apparatus, the first node further comprises a packet multiplexer (e.g., 506, FIG. 5) to connect the memory to the different network paths.

In some embodiments of any of the above apparatus, the packet header of the ingress packet has a single SID, the single SID being the replication SID.

According to yet another example embodiment disclosed above, e.g., in the summary section and/or in reference to any one or any combination of some or all of FIGS. 1-7, provided is an apparatus comprising a first node (e.g., R1, FIG. 1) that comprises packet-processing circuitry (e.g., 420-460, FIG. 4) and a memory (e.g., 410, 480, FIG. 4), the first node being configured to transmit to a second node (e.g., C2, FIG. 1) a packet set (e.g., S, FIG. 4) of two or more egress packets (e.g., 4041-404N, FIG. 4) in response to an ingress packet (e.g., 402, FIG. 4), each of the two or more egress packets being temporarily stored in the memory for being transmitted via a different respective network path (e.g., 1081-108N, FIG. 1) connecting the first and second nodes; and wherein the packet-processing circuitry is configured to: (i) copy a payload (e.g., "Payload," FIG. 4) of the ingress packet into each one of the two or more egress packets; and (ii) for each one of the two or more egress packets, generate a respective packet header (e.g., SRH's of 4041-404N, FIG. 4) having a respective copy of a replication segment identifier (SID) (e.g., "RSID," FIG. 4), the replication SID identifying a segment for processing a packet of the packet set at the second node.

In some embodiments of the above apparatus, at least one of the respective packet headers has a single SID, the single SID being the replication SID.

In some embodiments of any of the above apparatus, the respective packet header comprises a respective SID stack that includes at least a first SID (e.g., "SID CN," FIG. 4) and the replication SID, the first SID identifying a segment for reaching the second node.

In some embodiments of any of the above apparatus, the packet-processing circuitry is configured to generate the replication SID based on the ingress packet.

In some embodiments of any of the above apparatus, the packet-processing circuitry is configured to derive the replication SID from the payload.

In some embodiments of any of the above apparatus, the packet-processing circuitry is configured to apply a hash function to the payload to generate the replication SID.

In some embodiments of any of the above apparatus, the packet-processing circuitry comprises a value-derivation module (e.g., 420, FIG. 4) and a value converter (e.g., 430, FIG. 4), the value derivation-module being configured to derive an output value (e.g., 422, FIG. 4) from the payload, the value converter being configured to generate the replication SID by applying to the output value at least one of a truncation operation and a parsing operation.

In some embodiments of any of the above apparatus, the first node further comprises a packet demultiplexer (e.g., 490, FIG. 4) to connect the memory to the different respective network paths.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The functions of the various elements shown in the figures, including any functional blocks labeled as "processors" and/or "controllers"/"control circuits," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising a first node that comprises packet-processing circuitry and a memory, the first node being configured to receive from a second node a packet set of two or more egress packets in response to the second node receiving an ingress packet, each of the two or more egress packets being transmitted via a different respective network path connecting the first and second nodes, wherein:
   each egress packet of the two or more egress packets comprises:
      a copy of a payload of the ingress packet;
      a packet header comprising a replication segment identifier (RSID) identifying a replication segment, wherein the RSID is based on the payload of the ingress packet; and
   the memory is configured to store each egress packet received from the second node; and
   the packet-processing circuitry is configured to determine whether or not to delete the egress packet from the memory based on the egress packet's RSID, wherein:
      for each ingress packet, the two or more egress packets have the same RSID; and
      the length of the RSID in the egress packets is different for at least two different ingress packets.

2. The apparatus of claim 1, wherein the packet-processing circuitry is configured to:
   copy the payload of the egress packet into a corresponding outgoing packet if the packet-processing circuitry determines that the egress packet is a first-to-arrive packet of the packet set; and
   discard the egress packet if the packet-processing circuitry determines that the egress packet is a subsequent packet of the packet set.

3. The apparatus of claim 2, wherein the first node is configured to transmit the outgoing packet to a third node or deliver the outgoing packet to an application.

4. The apparatus of claim 2, wherein the packet-processing circuitry is configured to compute a padding value for a packet header of the outgoing packet.

5. The apparatus of claim 1, further comprising user equipment configured to implement the first node.

6. The apparatus of claim 1, wherein the packet-processing circuitry is configured to save in a lookup table the RSID of the egress packet if the packet-processing circuitry determines that the egress packet is a first-to-arrive packet of the corresponding packet set.

7. The apparatus of claim 6, wherein the packet-processing circuitry is configured to delete the saved RSID from the lookup table in response to an earlier of (i) a run-out of an expiration timer associated with the saved RSID and (ii) receipt of all of the two or more packets of the packet set.

8. The apparatus of claim 1, wherein the first node further comprises a packet multiplexer to connect the memory to the different network paths.

9. The apparatus of claim 1, wherein the packet header further comprises a segment-routing identifier identifying a segment of the respective network path for the egress packet for reaching the second node.

10. A method for an apparatus comprising a first node that comprises packet-processing circuitry and a memory, the first node receiving from a second node a packet set of two or more egress packets in response to the second node receiving an ingress packet, each of the two or more egress packets being transmitted via a different respective network path connecting the first and second nodes, wherein:
   each egress packet of the two or more egress packets comprises:
      a copy of a payload of the ingress packet;
      a packet header comprising a replication segment identifier (RSID) identifying a replication segment, wherein the RSID is based on the payload of the ingress packet; and
   the memory stores each egress packet received from the second node; and
   the packet-processing circuitry determines whether or not to delete the egress packet from the memory based on the egress packet's RSID, wherein:
      for each ingress packet, the two or more egress packets have the same RSID; and
      the length of the RSID in the egress packets is different for at least two different ingress packets.

11. The method of claim 10, wherein the packet-processing circuitry:

copies the payload of the egress packet into a corresponding outgoing packet if the packet-processing circuitry determines that the egress packet is a first-to-arrive packet of the packet set; and discards the egress packet if the packet-processing circuitry determines that the egress packet is a subsequent packet of the packet set.

12. The method of claim 11, wherein the first node transmits the outgoing packet to a third node or delivers the outgoing packet to an application.

13. The method of claim 11, wherein the packet-processing circuitry computes a padding value for a packet header of the outgoing packet.

14. The method of claim 10, wherein user equipment implements the first node.

15. The method of claim 10, wherein the packet-processing circuitry saves in a lookup table the RSID of the egress packet if the packet-processing circuitry determines that the egress packet is a first-to-arrive packet of the corresponding packet set.

16. The method of claim 15, wherein the packet-processing circuitry deletes the saved RSID from the lookup table in response to an earlier of (i) a run-out of an expiration timer associated with the saved RSID and (ii) receipt of all of the two or more packets of the packet set.

17. The method of claim 10, wherein a packet multiplexer connects the memory to the different network paths.

18. The method of claim 10, wherein the packet header further comprises a segment-routing identifier identifying a segment of the respective network path for the egress packet for reaching the second node.

\* \* \* \* \*